United States Patent [19]
Fujiura

[11] Patent Number: 5,743,213
[45] Date of Patent: Apr. 28, 1998

[54] TREATING MATERIAL FOR ANIMAL EXCRETIONS AND METHOD OF PRODUCING THE SAME

[75] Inventor: Yoji Fujiura, Kyoto, Japan

[73] Assignee: Sanyo Chemical Industries, Ltd., Kyoto, Japan

[21] Appl. No.: 279,816

[22] Filed: Jul. 25, 1994

Related U.S. Application Data

[63] Continuation of Ser. No. 862,187, Apr. 2, 1992, abandoned.

[30]     Foreign Application Priority Data

May 10, 1991   [JP]   Japan .................... 3-135929

[51] Int. Cl.$^6$ .................................. A01K 1/015
[52] U.S. Cl. .............. 119/172; 119/171; 119/173; 71/23; 71/909
[58] Field of Search ................... 119/171, 173

[56]              References Cited

U.S. PATENT DOCUMENTS

| | | |
|---|---|---|
| 4,286,082 | 8/1981 | Tsubakimoto et al. ............... 526/240 |
| 4,418,163 | 11/1983 | Murakami et al. .................. 428/407 |
| 4,607,594 | 8/1986 | Thacker ............................. 119/1 |
| 4,685,420 | 8/1987 | Stuart ............................. 119/171 |
| 4,844,010 | 7/1989 | Ducharme et al. ................... 119/1 |
| 5,101,771 | 4/1992 | Goss .............................. 119/173 |

FOREIGN PATENT DOCUMENTS

| | | |
|---|---|---|
| 62-239932 | 10/1987 | Japan . |
| 2092223 | 4/1990 | Japan ............................. 119/171 |
| 62-209223 | 4/1990 | Japan . |

Primary Examiner—Gary P. Straub
Attorney, Agent, or Firm—Merchant, Gould, Smith, Edell, Welter & Schmidt, P.A.

[57]              ABSTRACT

The invention relates to a treating material for animal excretions comprising agglomerates of a powdery or short-fiber-like excretion treating base material and fine powder of water-absorbent resin sprinkled on the agglomerates, and also to a method of producing a treating material for animal excretions which comprises forming agglomerates from a powdery or short-fiber-like excretion base treating material using water and then, sprinkling fine powder of a water-absorbent resin on the agglomerates. The treating material for animal excretions according to the invention can quickly absorb moisture, and its surface is brought to a half dry condition soon after it absorbs urine. Thus, it is possible to prevent urine from being attached to the pet's fur and paw, and contaminating the room or the like. Further, by absorbing urine, the treating material becomes a rubber-like mass. Thus, only its portion having absorbed urine can be easily taken out and disposed. It is thus useful for treating excretions of pets or like animals.

17 Claims, 1 Drawing Sheet

TREATING MATERIAL FOR ANIMAL EXCRETIONS AND METHOD OF PRODUCING THE SAME

This application is a continuation of U.S. application Ser. No. 07/862,187 filed Apr. 2, 1992, abandoned.

BACKGROUND OF THE INVENTION

1. Field of the Invention

The present invention relates to treating material for excretions of animals such as pets etc. and a method of producing the same. More particularly, the invention concerns a treating material which permits treatment of excretions of animals such as cats and dogs conveniently and efficiently, and a method of producing the same.

2. Description of the Prior Art

Recently, there are increasing cases of cats, dogs and other home pets being kept as if family members, and the treatment of pet's excretions is often a great burden for the family. As well-known treating material for pet excretions, there are those which are agglomerates of a mixture of particular proportions of inorganic particles such as zeolite particles etc., a water-absorbent resin and water, as disclosed in, for instance, Japanese Patent Application Laid-Open No. 108927/1989, and those which are obtained by drying agglomerates of a mixture of paper production residue, water-absorbent resin and water-soluble inorganic salt, as disclosed in, for instance, Japanese Patent Application Laid-Open No. 25629/1984.

However, the treating materials obtained by agglomerating a mixture of inorganic particles etc. or paper production residue and water-absorbent resin, have the following problems. (1) Because of a small moisture absorbing rate, unabsorbed urine remaining on the surface is attached to the fur and paw of the pet and makes the room dirty. (2) Since there is insufficient adhesion between the agglomerates which have absorbed urine, they fail to form a lump as a whole. Instead, they are present separately. Therefore, the removal of the agglomerates which absorbed the urine takes time. (3) The agglomerates having absorbed urine are great in number, thus increasing the amount of material used and disposed of.

SUMMARY OF THE INVENTION

The inventors have conducted extensive researches and investigations in order to provide a treating material for excretions of animals such as pets etc. and a method of producing the same, which can solve the above problems and, as a result, they completed the present invention.

It is an object of the invention to provide a treating material for animal excretions which can quickly absorb moisture, and the surface of which can attain a half dry condition immediately, and also a method of producing the same.

It is another object of the invention to provide a treating material for animal excretions which does not release once-absorbed moisture even with subsequent application of external pressure to it, and a method of producing the same.

It is a further object of the invention to provide a treating material for animal excretions, the treating material agglomerates may firmly adhere each other to form a rubber-like lump when they absorb moisture, and only the part which has absorbed moisture can be easily taken out for disposal, and a method of producing the same.

It is a still further object of the invention to provide a treating material for animal excretions which has a great water absorbing capacity and thus shows less wetness upon absorbing water and is thus economical, and a method of producing the same.

It is a yet further object of the invention to provide a simple method for producing a treating material for animal excretions.

According to the invention, there is provided a treating material for animal excretions, which comprises agglomerates of a powdery or short-fiber-like excretion treating base material and fine powder of water-absorbent resin sprinkled on the agglomerates.

According to the invention, there is also provided a method of producing a treating material for animal excretions which comprises forming agglomerates from a powdery or short-fiber-like excretion treating material using water and then sprinkling fine powder of a water-absorbent resin on the agglomerates.

DESCRIPTION OF THE PREFERRED EMBODIMENTS

Figure 1:
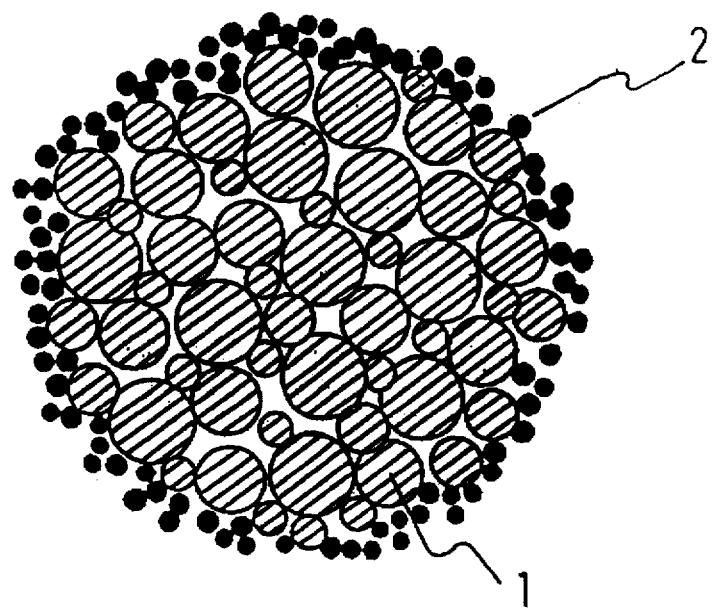
FIG. 1 is a sectional view showing an embodiment of the treating material according to the invention.

According to the invention, as the water-absorbent resin may be used ① those obtainable by polymerizing, (a) starch or cellulose, (b) a water-soluble monomer having a hydrophilic group such as carboxyl group and sulfonic acid group and/or a monomer capable of becoming water-soluble through hydrolysis and (c) a crosslinking agent and subsequently carrying out, if necessary, hydrolysis.

Details of the components (a), (b) and (c) used for producing the water-absorbent resins noted above and the proportions of the components (a), (b) and (c), method of production and specific examples of the water-absorbent resins, are described in Japanese Patent Application Laid-Open No. 25886/1977 and U.S. Pat. No. 4,076,663.

Examples of the water-absorbent resin other than those noted above, are ② those obtainable by polymerizing the components (a) and (b) (e.g., hydrolyzed product of starch-acrylonitrile graft copolymer or hydrolyzed product of cellulose-acrylonitrile graft copolymer), ③ crosslinked material of (a) (e.g., crosslinked carboxymethylcellulose), ④ copolymer of the components (b) and (c) (e.g., partially hydrolyzed product of crosslinked polyacrylamide, crosslinked acrylic acid-acrylamide copolymer, crosslinked sulfonated polystyrene, saponified vinylester-unsaturated carboxylic acid copolymer, crosslinked polyacrylic acid or salts thereof, crosslinked acrylic acid-acrylic acid ester copolymer, crosslinked isobutylene-maleic acid anhydride copolymer and crosslinked carboxylic acid denaturated polyvinyl alcohol) and ⑤ self-crosslinking polymerization product of the component (b) (e.g., self-crosslinkable polyacrylic acid salts). These water-absorbent resins may be used alone or in combinations of two or more of them.

Among the above examples of these water-absorbent resins, ① and some of ④ such as partially hydrolyzed product of crosslinked polyacrylamide, crosslinked acrylic acid-acrylamide copolymer, crosslinked polyacrylic acid or salts thereof (e.g., alkali metal salts, ammonium salts, etc.), crosslinked acrylic acid-acrylic acid ester copolymer, crosslinked isobutylene-maleic acid anhydride copolymer and crosslinked carboxylic acid denaturated polyvinyl alcohol are preferable.

The preferable water-absorbent resins in the above are those having a water absorption capacity with respect to pure water of at least 50 ml/g, preferably 100 to 1,000, ml/g. The particle size of the fine powder of water-absorbent resin is 1 to 840 microns, preferably 5 to 200 microns.

Examples of the excretion treating base material according to the invention are inorganic powder, e.g., kaolin, bentonite, silica sand, shirasu balloon, diatomaceous earth, clay, zeolite, fly ash, etc.; natural fibers, e.g., pulp, straw, grass peat, peat-moss, etc., organic short fibers, e.g., such synthetic fibers as rayon, polyester and polyamide cut short; sawdust, and cellulosic pulverized product of paper (such as newspapers, cardboards, magazines, etc.) and the like. These inorganic powder and cellulosic pulverized products usually have a particle diameter (or length of major axis) ranging from 1 to 800 microns, preferably 5 to 200 microns. The length of the organic short fibers is usually 0.001 to 20 mm, preferably 0.01 to 10 mm. These excretion treating base materials may be used alone or in combination of two or more of them.

The agglomerates of the excretion treating base materials may be produced ① by adding a small quanaity of water as binder while mechanically stirring the material or ② by a compression molding process for agglomeration.

As a specific example of the process ①, the excretion treating base material (hereinafter referred to as base material) is put into a mixer, e.g., Nauta mixer, a ribbon blending mixer, a conical blender, a mortar mixer, a universal mixer, etc., and adding a small quantity of water as uniformly as possible while stirring them. In this way, agglomerates can be readily obtained. As a method for adding water, there is, for instance, spraying water on the base material, blowing steam to the base material, or holding the base material under a high relative humidity condition to cause it to absorb moisture. As the binder for agglomerating the base material, usually water is used. For the purpose of a binding effect or an effect of improving the water permeability of the agglomerates of the base material, it is possible, if necessary, to add inorganic salts, alcohols, ethylene glycol, glycerin, polyethylene glycol, polyvinyl alcohol, a surface active agents, and so forth to water.

The amount of water to be added varies depending on the kind of the base material. Usually it is 1 to 100%, preferably 2 to 50% by weight of the weight of the base material. Adding excessive water results in soft agglomerates, which may collapsed or stick to one another. In this case, there is no problem if the agglomerates are then dried. However, upon such adding of excess water, drying the agglomerates again after the agglomeration is required, and thus the method is uneconomical. That is, it is preferred to carry out agglomeration with addition of an adequate quantity of water, which does not require re-drying. If quantity of added water is insufficient, on the other hand, sufficient agglomeration can not be obtained.

Further, by carrying out the agglomeration in a heated state at 40° to 90° C., it is possible to increase the agglomeration speed and mechanical strength of agglomerates and permit efficient agglomeration.

As a specific example of the process ② mentioned previously, the base material is press molded into pellets in a mold having adequate shape and size. As another example, the base material is press molded into the form of sheet, rod or block, which is then cut or pulverized to an adequate size. In the above processes, pressure is applied usually under the room temperature. However, it is possible to apply pressure at an elevated temperature (for instance 30° to 300° C.) or under an elevated relative humidity (for instance 2 to 100%).

The pressure in the press molding may be suitably selected depending on the kind, grain size and character of the base material. Usually, it is 1 to 3,000 kg/cm$^2$, preferably 10 to 2,000 kg/cm$^2$. The press molding may be carried out by using a roller type compression molding machine (e.g., a compacting press machine, a bricketting press machine, etc.), a piston type press molding machine, a screw type press extruder, a filter plate extruder and so forth. The press molded product obtained in the above way may be cut or pulverized to obtain agglomerates having adequate shape and size if necessary.

According to the invention, the agglomerates may have any shape, for instance, spherical, cylindrical, plate-like, rock-like, rectangular, conical, pyramidal, rod-like and so forth. In any shape, their size is preferably 0.1 to 20 mm, more preferably 0.5 to 10 mm, in the maximum diameter.

The fine powder of water-absorbent resin is sprinkled on the agglomerates, thus obtaining the excretion treating material according to the invention. The fine powder of water-absorbent resin is added usually in an amount of 1 to 50%, preferably 3 to 30%, by weight of the agglomerate. If the amount is less than 1% by weight, the speed of absorbing pet's urine is reduced. An amount in excess of 50% by weight is uneconomical.

As for the size of the excretion treating material obtainable in the above way according to the invention, the material has the maximum diameter of 0.5 to 50 mm preferably, and of 1.0 to 20 mm more preferably. With the size in this range, it is preferable that the material having absorbed a great quantity of urine or the like does not become paste- or liquid-like as a whole but can be suitably handled as solid.

According to the invention, the fine powder of water-absorbent resin can be readily sprinkled on the agglomerates (i.e., attached or adhered to the agglomerate surface) by mechanically blending the agglomerates and fine powder of water-absorbent resin. A small quanatity of water present on the agglomerate surface serves as a binder, and the fine powder of the water-absorbent resin is bonded on the agglomerate surface. However, if the quantity of water on the agglomerate surface is insufficient, sufficient bonding can not be obtained. If the quantity of the water is excessive, on the other hand, water-absorbent resin powders bonded to the agglomerates surface become gel-like, and their adhesion is reduced. The adequate quantity of water varies depending on the kind and characteristics of the base material, shape and grain size of the agglomerates, kind and characteristics of the water-absorbent resin and so forth. Usually, it is 1 to 100%, preferably 2 to 50%, by weight.

The fine powder of water-absorbent resin may be sprinkled on the agglomerates immediately after completion of the agglomeration process in the same agglomeration equipment by adding the fine powder of water-absorbent resin. Alternatively, the agglomerates formed may be shifted to a separate container and then subjected to the sprinkling of the fine powder of water-absorbent resin.

The excretion treating material according to the invention may contain 0.01 to 10% by weight of each of such additives as deodorizer, perfume, sterilizer, moldproofing agent, antiseptic agent, antiblocking agent, surface active agent, silvervine to cat or a similar favored material by the pet and volume extending filler. These additives may be added at any time so long as they are present in the excretion treating material according to the invention. For example, they may be added to the base material or agglomerates thereof or the fine powder of water-absorbent resin, or they may be added during or after the step of sprinkling the fine powder of water-absorbent resin on the agglomerates.

The excretion treating material according to the invention may be used in the form of a simplified toilet by laying it in the container. When a cat, a dog or like animal discharges excretions in such a simplified toilet, the material quickly absorbs the moistures of the excretions, and agglomerates having absorbed the moisture stick together into a rubber-like lump. Thus, this lump portion can be readily picked up, which is convenient for disposal.

Figure 2:
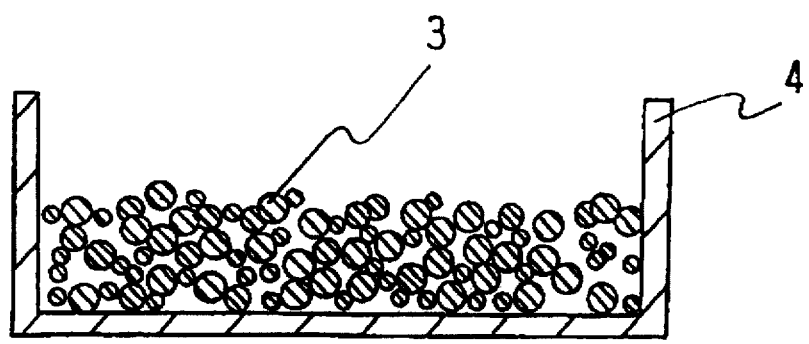
FIG. 2 is a sectional view showing an embodiment of a simplified toilet for pets using the treating material according to the invention.

The excretion treating material according to the invention is illustrated refering to the drawings. FIG. 1 is a sectional view showing an embodiment of the treating material according to the invention. Designated at 1 is the agglomerate of the base materials and at 2 is the water-absorbent resin. FIG. 2 is a sectional view showing an embodiment of simplified toilet using the treating material according to the invention. Designated at 3 is the treatment material according to the invention, and at 4 is a container.

EXAMPLES

The invention will now be illustrated with reference to following examples that by no means limit the scope of the invention.

Example 1 and Comparative Example 1

500 g of "Kunigel V-1", commercially available bentonite manufactured by Kunimine Ind. Co., was put into a 2-liter small size universal blending mixer externally held at about 50° C., and 50 ml of water heated to about 50° C. was added gradually while stirring at 100 rpm to agglomerate. The stirring was continued until hard agglomerates with the maximum diameter of about 2 to 6 mm were produced. A predetermined quantity of "SANWET IM-1000MPS", fine powder of a graft starch type water-absorbent resin manufactured by Sanyo Chemical Industries, Ltd., with an average particle size of 30 μm and a water absorption capacity of 1,000 ml/g., was added to these agglomerates and sprinkled on the agglomerate surface by stirring again at 100 rpm to obtain an excretion treating material according to the invention. The obtained material had a maximum diameter of 2 to 10 mm.

400 g of this treating material was taken in a 1-liter beaker, and its surface was leveled. 30 cc of artificial urine was charged into a 50-cc disposable syringe (manufactured by Termo Co., Ltd.) and was discharged vertically toward the center of the surface of the material in the beaker from a height of about 2 cm in 5 seconds. The absorbing rate of the artificial urine was measured. Five minutes after the dischaging of the artificial urine, the part of the treating material lumped from absorption of the urine was taken out using tweezers, and the adhesion of the lump and the weight of the wetted portion (the less the better) were measured. The results of measurement are shown in Table 1.

As comparative examples, the agglomerates without sprinkled water-absorbent resin, and the agglomerates obtained by uniformly blending bentonite and the water-absorbent resin and carrying out agglomeration in the same method and with the same apparatus as in Example 1 (i.e., the water-absorbent resin was not sprinkled on the surface of the agglomerates but uniformly dispersed in the agglomerates), were subjected to the urine absorption test. The results are also shown in Table 1.

Example 2

The same tests as in Example 1 were conducted except for using different base materials and water-absorbent resins. In any test, the fine powder of water-absorbent resin was added in the amount of 10% by weight of the agglomerates. The results are shown in Table 2. The maximum diameter of the agglomerates obtained was 0.5 to 5 mm. As for the size of the obtained treating material, the maximum diameter was 3 to 15 mm.

Example 3 and Comparative Example 3

Various organic short fibers (fiber length: 0.1 to 5 mm, moisture content: 5 to 15% by weight) and cellulosic pulverized materials (particle size: 0.1 to 5 mm, moisture content: 5 to 15% by weight) were pressed with a linear pressure of 500 kg/cm using a roller type compression molding machine to obtain a plate with a thickness of 5 mm, which was then cut using a cutter to obtain agglomerates (pressed pellets) with a agglomerate size of about 5 mm.

10% by weight of "SANWET IM-1000 MPS", fine powder of starch graft type water-absorbent resin (average particle size: 30 μm, water absorption capacity: 1,000 ml/g) manufactured by Sanyo Chemical Industries, Ltd., was added to these agglomerates and was sprinkled on the agglomerate surface by stirring at 100 rpm to obtain an excretion treating material according to the invention.

200 g of this treating material was then taken in a 1-liter beaker, and its surface was leveled. Then, 30 cc of an artificial urine was taken in a 50-cc disposable syringe (manufactured by Termo Co., Ltd.) and discharged vertically toward the center of the surface of the material in the beaker from a height of about 2 cm in 5 seconds. The absorbing rate of the artificial urine was measured. After 5 minutes from the dischrging of the artificial urine, the part of the treating material lumped from absorption of the urine was taken out using tweezers, and the adhesion of the lump and weight of the wetted portion (the lower the better) were measured. The results are shown in Table 3.

As comparative examples, the agglomerates without sprinkled water-absorbent resin, and the agglomerates obtained by uniformly blending bentonite and the water-absorbent resin and carrying out agglomeration in the same method and with the same apparatus as in Example 3 (i.e., the water-absorbent resin was not sprinkled on the surface of the agglomerates but uniformly dispersed in the agglomerates), were subjected to the urine absorption test. The results are also shown in Table 3.

TABLE 1

| | "SANWET IM-1000MPS" | | Results of urine absorption test | | |
|---|---|---|---|---|---|
| No. | Dosage (wt %) | Addition method | Rate of water absortion (sec.) *1 | Adhesion *2 | Weight of water absorbed part (g) |
| Example 1 | | | | | |
| 1-1 | 5 | Sprinkled on the surface of agglomerates | 5.7 | Excellent | 58.1 |
| 1-2 | 10 | | 4.3 | Excellent | 52.9 |
| 1-3 | 20 | | 3.7 | Excellent | 50.6 |
| 1-4 | 30 | | 3.5 | Excellent | 49.7 |
| Comparative Example 1 | | | | | |
| 1-5 | 0 | Uniformly added in | 80.5 | Inferior | 102.5 |
| 1-6 | 5 | | 20.2 | Inferior | 88.2 |

TABLE 1-continued

| No. | "SANWET IM-1000MPS" Dosage (wt %) | Addition method | Rate of water absortion (sec.) *1 | Adhesion *2 | Weight of water absorbed part (g) |
|---|---|---|---|---|---|
| 1-7 | 10 | the agglomerates | 17.5 | Inferior | 81.4 |
| 1-8 | 20 | | 15.2 | Passable | 77.4 |
| 1-9 | 30 | | 15.0 | Passable | 66.0 |

(Note)
*1: Time (sec.) from the end of sprinkling of the artificial urine, to the water on the surface of the treating material being absorbed substantially.
*2: Adhesion of the water absorbed part.
Excellent: Water-absorbed agglomerates are firmly adhered with each other to form a rubber-like lump.
Passable: 50 to 70% of Water-absorbed agglomerates are forming a lump.
Inferior: Less than 50% of water-absorbed agglomerates are forming a lump.

TABLE 2

| No. Example 2 | Main component of base material powder *3 | Kind of water-absorbent resin *4 | Rate of water absorption (sec.) | Adhesion | Weight of water absorbed part (g) |
|---|---|---|---|---|---|
| 2-1 | Bentonite | Polymer A | 4.3 | EXS *5 | 52.9 |
| 2-2 | Silica sand | Polymer A | 6.2 | EXS | 63.1 |
| 2-3 | Kaolinite | Polymer A | 6.4 | EXS | 63.5 |
| 2-4 | Zeolite | Polymer A | 6.6 | EXS | 64.9 |
| 2-5 | Bentonite | Polymer B | 4.9 | EXS | 55.1 |
| 2-6 | Bentonite | Polymer C | 5.2 | EXS | 56.9 |
| 2-7 | Bentonite | Polymer D | 5.5 | EXS | 57.5 |

(Note)
*3: Particle distribution of the base material powder: The particle size was 5 to 150 μm in any sample.
*4: Kind of water-absorbent resin (main component)
Polymer A — "SANWET IM-1000MPS", a trade name by Sanyo Chemical Industries, ltd. of a starch/sodium acrylate graft polymer type water-absorbent resin (average particle size: 30 μm, water absorption capacity: 1,000 ml/g)
Polymer B — "SANWET IM-5000MPS", a trade name by Sanyo Chemical Industries, Ltd. of a sodium poly-acrylate type water-absorbent resin (average particle size: 25 μm, water absorption capactiy: 450 ml/g)
Polymer C — Polyvinyl alcohol/sodium polyacrylate type water-absorbent resin (average grain size: 30 μm, water absorption capacity: 350 ml/g)
Polymer D — Isobutylene/sodium maleate copolymer type water-absorbent resin (average grain size: 30 μm, water absorption capacity: 400 ml/g)
The fine powder of water-absorbent resin in any sample was added by 10% by weight of agglomerates.
*5: "EXS" means "Excellent"

TABLE 3

| No. | Main component of agglomerates | Addition method of water-absorbent resin | Rate of water absorption (sec.) *1 | Adhesion *2 | Weight of portion with absorption (g) |
|---|---|---|---|---|---|
| | | Example 3 | | | |
| 3-1 | Pulp | Sprinkled on the surface of agglo- merates | 6.2 | EXS *3 | 39.1 |
| 3-2 | Pulp of used newspaper | | 6.8 | EXS | 39.5 |
| 3-3 | Peat-moss | | 7.9 | EXS | 42.6 |
| 3-4 | Sawdust | | 8.3 | EXS | 44.0 |
| | | Comparative Example 3 | | | |
| 3-5 | Pulp | Uniformly added in the agglo- merates | 19.1 | Passable | 43.7 |
| 3-6 | Pulp of used newspaper | | 21.3 | Passable | 45.5 |
| 3-7 | Peat-moss | | 22.2 | Passable | 47.3 |
| 3-8 | Sawdust | | 23.9 | Passable | 49.4 |
| 3-9 | Pulp | Not added | 88.3 | Inferior | 65.0 |

(Note)
*1: Time (sec.) from the end of sprinkling of the artificial urine, to the water on the surface of the treating material being absorbed substantially.
*2: Adhesion of the water absorbed part.
Excellent: Water-absorbed agglomerates are firmly adhered with each other to form a rubber-like lump.
Passable: 50 to 70% of Water-absorbed agglomerates are forming a lump.
Inferior: Less than 50% of water-absorbed agglomerates are forming a lump.
*3: "EXS" means "Excellent"

The treating material for animal excretions and the method of producing the same of the invention have the following excellent effects.

(1) The material can quickly absorb moisture, and its surface soon attains a half dry state. Thus, it can prevent contamination the room etc., from attaching of urine to the fur and paw of animals such as pets etc.

(2) The water-absorbent resin absorbs moisture not by physical absorption such as capillary phenomenon but by chemical absorption. Thus, moisture once absorbed is not released when an external pressure is applied.

(3) Agglomerates of the treating material can firmly adhere to each other to form a rubber-like lump when they absorb moisture. Thus only the part that has absorbed moisture can be readily taken out and disposed of.

(4) The treating material has high water absorption capacity, and thus it is less wetted by water absorption, so it is economical.

(5) In the method according to the invention, the agglomerating step can be easily carried out using a small quantity of water as a binder. The step of sprinkling the fine powder of water-absorbent resin also can be easily carried out because the fine powder is attached to the agglomerates' surface owing to water thereon which serves as a binder.

With the above effects, the treating material according to the invention is useful for treating excretions of animals such as pets etc.

What is claimed is:

1. A treating material for animal excretions comprising:
   agglomerates which contain a powdery or short-fiber-like excretion treating base material formed with water and having a water content of 1 to 100% by weight based on the weight of the base material, the base material being selected from the group consisting of inorganic powder, natural fibers, organic short fibers, sawdust and cellulosic pulverized product; and
   fine powder of water-absorbent synthetic resin adhered to the surface of said agglomerates;
   wherein the water-absorbent synthetic resin has a particle diameter of about 200 microns or less and a water-absorption capacity with respect to pure water of about 350 to 1000 ml/g and absorbs moisture by chemical absorption, said water-absorbent synthetic resin being at least one selected from the group consisting of a crosslinked starch/sodium acrylate graft polymer water-absorbent resin, a crosslinked sodium polyacrylate water-absorbent resin, a crosslinked polyvinyl alcohol/ sodium polyacrylate water-absorbent resin, and a crosslinked isobutylene/sodium maleate copolymer water-absorbent resin.

2. A treating material for animal excretions according to claim 1, wherein said excretion treating base material is an inorganic powder.

3. A treating material for animal excretions according to claim 1, wherein said excretion treating base material is at least one material selected from the group consisting of organic short fibers and cellulosic pulverized materials.

4. A treating material for animal excretions according to claim 1, wherein said agglomerates have a maximum diameter of about 0.1 to 20 mm.

5. A treating material for animal excretions according to claim 1, wherein said treating material has a maximum diameter of about 0.5 to 50 mm.

6. The treating material for animal excretions according to claim 1, wherein said fine powder of water-absorbent resin is present in an amount of about 1 to 50% by weight of said agglomerates.

7. The treating material of claim 1, wherein the water content of the agglomerates is 2 to 50% by weight based on the weight of the base material.

8. The treating material of claim 1, wherein the base material is selected from the group consisting of kaolin, bentonite, silica sand, shirasu balloon, diatomaceous earth, clay, zeolite, fly ash, pulp, straw, grass peat, peat-moss, synthetic fibers cut short, sawdust and a cellulosic pulverized product of paper.

9. A method for producing a treating material for animal excretions, which comprises forming agglomerates from a powdery or short-fiber-like excretion treating base material using water, the agglomerates having a water content of 1 to 100% by weight based on the weight of the base material, and then adhering fine powder of a water-absorbent synthetic resin on the agglomerates, wherein the base material is selected from the group consisting of inorganic powder, natural fibers, organic short fibers, sawdust and cellulosic pulverized product, and the water-absorbent synthetic resin has a particle diameter of about 200 microns or less and a water-absorption capacity with respect to pure water of about 350 to 1000 ml/g and absorbs moisture by chemical absorption, said water-absorbent synthetic resin being at least one selected from the group consisting of a crosslinked starch/sodium acrylate graft polymer water-absorbent resin, a crosslinked sodium polyacrylate water-absorbent resin, a crosslinked polyvinyl alcohol/ sodium polyacrylate water-absorbent resin, and a crosslinked isobutylene/sodium maleate copolymer water-absorbent resin.

10. A method of producing a treating material for animal excretions according to claim 9, wherein water is added in an amount of about 1 to 100% by weight of said excretion treating base material.

11. A method of producing a treating material for animal excretions according to claim 9, wherein said excretion treating base material is inorganic powder.

12. A method of producing a treating material for animal excretions according to claim 9, wherein said excretion treating base material is at least one material selected from the group consisting of organic short fibers and cellulosic pulverized materials.

13. A method of producing a treating material for animal excretions according to claim 9, wherein the step of forming agglomerates forms agglomerates having a maximum diameter of about 0.1 to 20 mm.

14. The method of producing a treating material for animal excretions according to claim 9, wherein said treating material has a maximum diameter of about 0.5 to 50 mm.

15. The method of producing a treating material for animal excretions according to claim 9, wherein said fine powder of water-absorbent resin is present in an amount of about 1 to 50% by weight of said agglomerates.

16. The method of claim 9, wherein the amount of water in the agglomerates is 2 to 50% by weight based on the weight of the base material.

17. The method of claim 9, wherein the base material is selected from the group consisting of kaolin, bentonite, silica sand, shirasu balloon, diatomaceous earth, clay, zeolite, fly ash, pulp, straw, grass peat, peat-moss, synthetic fibers cut short, sawdust and a cellulosic pulverized product of paper.

* * * * *